United States Patent [19]

Hamaekers et al.

[11] Patent Number: 5,474,284
[45] Date of Patent: Dec. 12, 1995

[54] SINGLE-THRUST BEARING FOR A SHOCK ABSORBER

[75] Inventors: Arno Hamaekers, Gorxheimer Tal; Arnold Simuttis, Bad Kreuznach; Manfred Stahl, Edingen-Neckarhausen, all of Germany

[73] Assignee: Firma Carl Freudenberg, Weinheim, Germany

[21] Appl. No.: 213,364

[22] Filed: Mar. 14, 1994

Related U.S. Application Data

[63] Continuation of Ser. No. 871,429, Apr. 21, 1992, abandoned, which is a continuation of Ser. No. 780,147, Oct. 21, 1991, abandoned.

[30] Foreign Application Priority Data

Oct. 22, 1990 [DE] Germany ............ 40 33 519.4

[51] Int. Cl.$^6$ ............ B60G 13/00; F16M 5/00
[52] U.S. Cl. ............ 267/220; 267/140.13; 248/636; 248/562; 180/312
[58] Field of Search ............ 267/219, 220, 267/35, 140.13, 141.1, 141.2, 141.3, 141.4, 141.5; 248/636, 638, 562; 180/241, 312

[56] References Cited

U.S. PATENT DOCUMENTS

| 5,005,810 | 4/1991 | Sawada et al. | 267/140.1 A |
| 5,040,775 | 8/1991 | Miyakawa | 267/220 |

FOREIGN PATENT DOCUMENTS

| 3710629 | 10/1988 | Germany | 267/220 |
| 3823238 | 2/1989 | Germany | 267/220 |

Primary Examiner—Robert J. Oberleitner
Assistant Examiner—Lee W. Young
Attorney, Agent, or Firm—Kenyon & Kenyon

[57] ABSTRACT

A single-thrust bearing for a shock absorber with a columnar journal projecting in the damping direction and which is sealingly surrounded by a flexible, annular-shaped membrane, whereby the membrane is secured in its rim area, which projects radially to the outside, to a supporting bearing and separates two liquid-filled working chambers from each other. The working chambers are defined in the area of the extremities which mutually oppose each other by hollow-conical bearing springs made of a rubber elastic material. The bearing springs are supported in their base area on the supporting bearing and are braced against one another by means of the journal by way of their tips which are turned away from each other.

6 Claims, 1 Drawing Sheet

SINGLE-THRUST BEARING FOR A SHOCK ABSORBER

This application is a continuation of application Ser. No. 07/871,429, filed on Apr. 21, 1992, now abandoned, which in turn is a continuation of application Ser. No. 07/780,147, filed Oct. 21, 1991, now abandoned.

BACKGROUND OF THE INVENTION

The invention relates generally to single-thrust bearings for shock absorbers, and more particularly to a single-thrust bearing with a columnar journal projecting in the damping direction and which is sealingly surrounded by a flexible, annular-shaped intermediary member. This intermediary member is secured in its rim area to a supporting bearing and separates two liquid-filled working chambers from each other. The rim area of the intermediary member projects radially to the outside. The liquid-filled working chambers are connected at least by one duct-type connecting port and are sealed to the outside by means of flexible terminating walls. These terminating walls are secured and sealed on one side to the journal and on the other side to the supporting bearing.

Such a single-thrust bearing is known from the German Patent 38 02 105. The intermediary member mentioned therein is a bearing spring and separates two working chambers from each other. These working chambers are sealed to the outside by means of membrane-type terminating walls. These types of single-thrust bearings have limited damping action and service life.

The present invention is directed to the problem of developing a single-thrust bearing with considerably improved damping action and service life.

SUMMARY OF THE INVENTION

The present invention solves this problem by providing the intermediary member with a membrane, by forming the terminating walls using hollow-conical bearing springs, by inserting the bearing springs with their tips pointing away from each other, and by bracing the bearing springs against one another by means of the journal.

This completely eliminates the contraction strains, which are caused by the heat vulcanization of the rubber elastic material of which the bearing springs are made—resulting in an improved service life. An advantageous refinement occurs when the bracing, which actually is a pressure pre-loading, is chosen so as to completely rule out the occurrence of tensile stresses in the bearing springs, even during absorption of vibrations.

Due to the mutual bracing of the hollow-conical bearing springs, a latent overpressure prevails in the two working chambers of the single-thrust bearing according to the present invention. This prevents occurrences of cavitation during the time that vibrations are introduced, thus improving long-term durability.

A damping action results in the single-thrust bearing according to the present invention when large-amplitude vibrations are introduced. This damping action is definitively based on the pressing of liquid components through the connecting port. The damping action is effective in a wide band, i.e. over a large frequency range, when the connecting port is designed as a choke opening. However, there are also application cases in which a high-quality damping action is desired for a specific frequency range. For such applications, a duct-type shape is recommended for the connecting port, as well as dimensions that produce a resonant movement of the bulk liquid surrounded by the connecting port, when vibrations of the frequency to be damped are introduced.

Due to the existence of a connecting port between the two working chambers, the pressure difference resulting in these chambers under normal operating conditions is only relatively small. The intermediary member between the working chambers can have a membrane-like thin shape and consist of a rubber elastic material. In this case, one does not have to fear premature destruction. The relative mobility of the journal in relation to the journal bearing is thus not significantly impeded.

The membrane can be flexibly expanded by the journal in the area of its inner circumference, in order to simplify the required mutual sealing of both parts. Independently of this, it is of course possible to use secondary sealing means.

It has proven to be particularly advantageous when the membrane contacts the journal in a way that allows relative displacement. This enables any destruction resulting from increased spring-deflection movements of the journal to be effectively countered.

With respect to attaining a long service life, it has proven to be advantageous when the membrane is provided in the area of its inner circumference with a bulge-like circumferential thickening. This enables the radial contact pressures which are transferrable to the journal to be increased, so that an improved sealing action results. In addition, in variants capable of relative shifting, the wearing volume is enlarged, thus improving longevity.

Inside the supporting bearing, the membrane can have a U-shaped profile that projects radially in the damping direction and surrounds the journal coaxially. In such a design, the deformability corresponds to that of a rolling diaphragm, so that the relative mobility of the journal is improved in relation to the supporting bearing and is particularly advantageous as far as the insulation of acoustically disturbing vibrations is concerned. These types of vibrations can result in the vicinity of the wheel suspension mount of a motor vehicle when it is driven fast over rough roadway surfaces or when tires are used which have a rough tread profile. In cases of poor insulation, the vibrations can become noticeable in the motor vehicle as droning vibrations.

To attain an excellent uncoupling of chassis vibrations of the above-mentioned type from a motor-vehicle, it has proven to be advantageous when the membrane consists of a particularly flexible, rubber elastic material, for example of a material with a Shore hardness A of 30 to 45. The shaping resistance with respect to the working chambers that is required to attain a good damping effectiveness can still be achieved when the lateral sides of the U-shaped profile, which follow one another in the radial direction and extend essentially parallel to the axis, have a radial thickness which conforms for the most part with their radial clearance. The corresponding axial depth of the recess surrounded by the U-shaped profile should correspond more or less to 2 to 4 times the value of the radial width to prevent a radial compression and the formation of folds and, to guarantee a low resistance to deformation in view of the spring deflection of the journal.

A further improvement is able to be attained when the lateral side, lying radially to the inside, of the U-shaped profile of the membrane is directly adjacent to the journals, and the lateral side, lying radially to the outside, of the U-shaped profile is directly adjacent to the supporting bearing. By this means, the U-shaped profile of the membrane experiences reinforcement in the radial direction, which prevents instances of eccentricity, and in view of long-term use of the single-thrust bearing, this guarantees a particularly uniform rolling process for the U-shaped profile of the membrane.

In the vicinity of the membrane rim which projects radially to the outside, the membrane can be axially embraced by supporting plates of the supporting bearing which extend at essentially right angles to the damping direction. In such a variant, the membrane can be produced independently of the supporting plates and the supporting bearing, which is advantageous from the standpoint of production engineering.

One is able to obtain an excellent uncoupling of acoustically disturbing vibrations by configuring the supporting plates to embrace the outwardly protruding rim of the membrane with axial clearance. The clearance is dimensioned so that acoustically disturbing vibrations can be absorbed, while at the same time avoiding an elastic deformation of the membrane due to simple back-and-forth movement. This type of variant completely rules out the transfer of forces across the membrane when such vibrations are introduced.

The above-mentioned effect manifests itself very clearly when the supporting plates in the vicinity of the outwardly protruding rim of the membrane are perforated like a grid in the direction of the working chambers. The liquid volume contained between the rim and the membrane can escape more easily in the case of such a variant, thus improving the relative mobility of the membrane.

DETAILED DESCRIPTION

Figure 1:
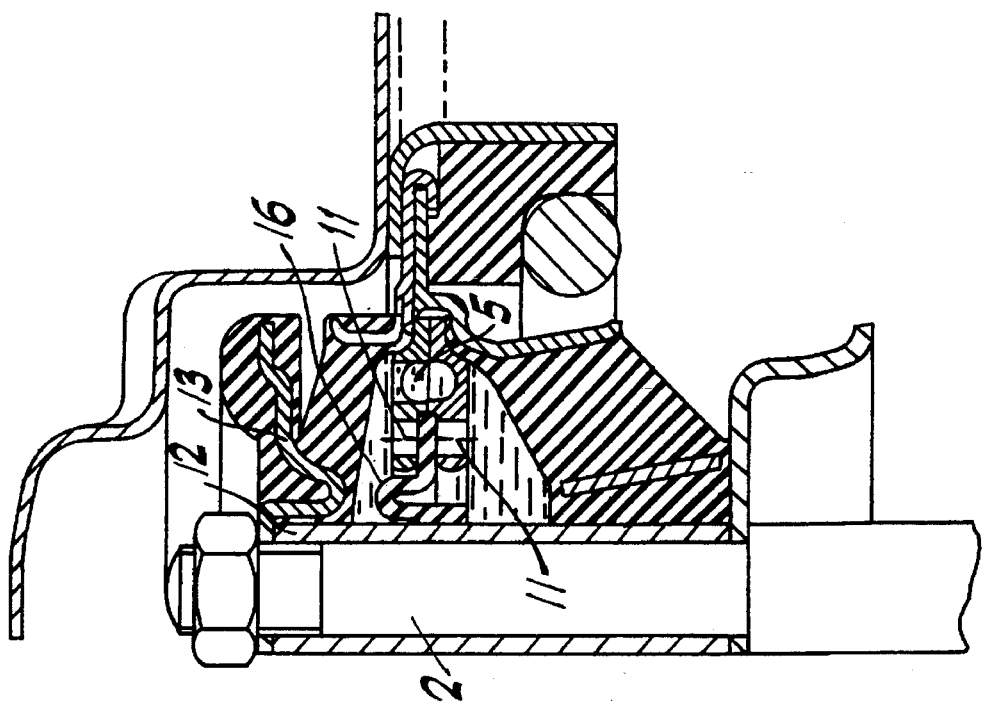
FIG. 1 depicts a single-thrust bearing for a shock absorber, showing one side of a longitudinal cross section, which shock absorber can constitute part of a spring compression leg.

In FIG. 1, the shock absorber 1 is provided with a columnar journal 2 projecting in the damping direction. The columnar journal 2 is surrounded and sealed against by an annular-shaped membrane 8. In the vicinity of the membrane rim, which projects radially to the outside, the membrane is axially surrounded by two supporting plates 10, which are fixed in the supporting bearing 3. The membrane 8 and the supporting plates 10 separate two liquid-filled working chambers 4 from each other, which are interconnected by a duct-type connecting port 5. The two working chambers 4 are sealed off to the outside in the axial direction by flexible terminating walls 6, 7, which have a hollow-conical shape. The terminating walls 6, 7 are designed as bearing springs and are fixed at their base to the supporting bearing 3. The tips of the bearing springs 6, 7 are turned away from each other and surround the journal 2, and have mutually opposing ends braced against one another by means of the journal 2. The journal 2 constitutes a part of the shock absorber which is not shown. The membrane 8 has a dynamically balanced design. An alternative embodiment of membrane 8 is depicted in FIG. 2 as membrane 16.

Figure 2:
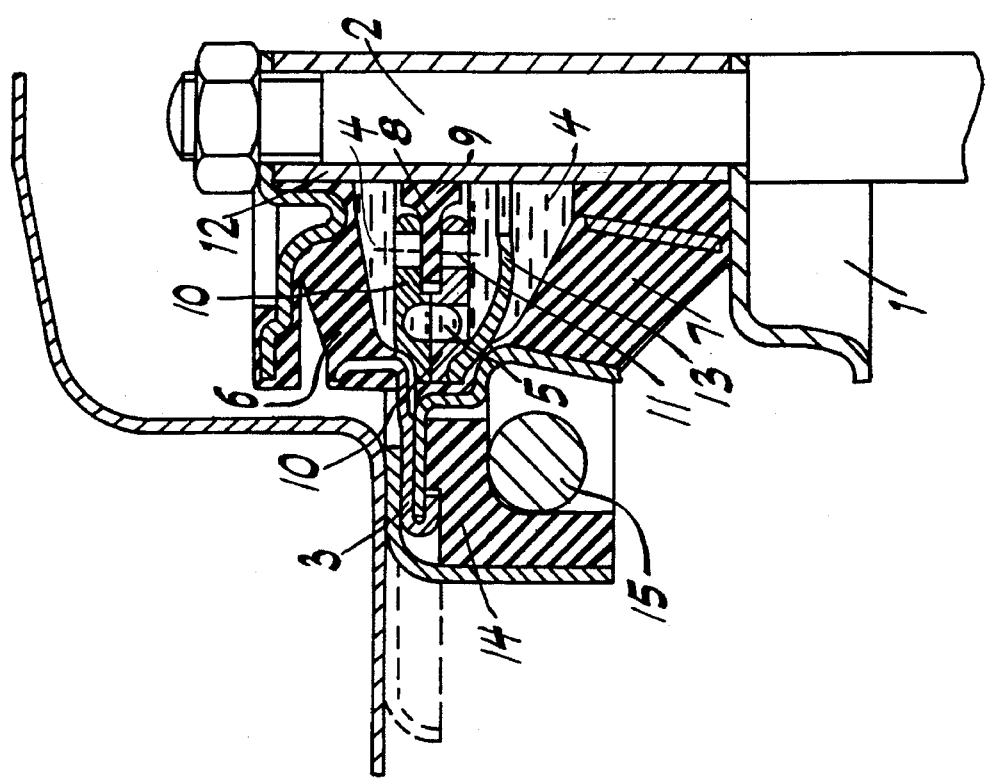
FIG. 2 depicts an alternative embodiment of a single-thrust bearing for a shock absorber, showing the other side of a longitudinal cross section, which shock absorber can constitute part of a spring compression leg.

The variant of the membrane shown both in FIG. 1 and FIG. 2 is embraced with axial clearance by supporting plates 10 in the vicinity of its rim which protrudes outwardly in the radial direction. In the vicinity of the rim, the supporting plates 10 have a grid-type design and are provided with perforations 11 which open in the direction of the working chambers 4. By this means, when acoustically disturbing, high-frequency vibrations are introduced, the rim and thus the membranes 8, 16 are easily displaceable in the damping direction relative to the supporting plate 10. This substantially rules out a transfer of such vibrations to the supporting bearing 3.

Both variants of the membranes 8, 16 are defined radially to the inside by bulge-like circumferential thickenings 9, which contact and seal a protective sleeve 12 with elastic pre-loading. The protective sleeve 12 surrounds the journal 2. The bulge-like thickenings 9 are displaceable in the damping direction relative to the protective sleeve 12 and thus to the journal 2. This substantially rules out any damage to the membrane 8, 16 when extreme inward or outward spring deflections occur.

The variant of a usable membrane shown in FIG. 1 consists of an annular segment which projects outwardly in the radial direction and which is directly contiguous to the bulge-type thickening 9 which limits the membrane to the inside.

The membrane depicted in FIG. 2, on the other hand, has a U-shaped profile which protrudes in the damping direction between the thickening and the rim which projects outwardly in the radial direction. This profile embraces the journal 2 coaxially. In this case, the lateral sides of the U-shaped profile, which are located such that one side is closer to the journal than the other and which extend essentially parallel to the axis, have a radial thickness which conforms for the most part with their radial clearance. In this manner and as a result of the small radial clearance from the protective sleeve exhibited by the inwardly-lying lateral side of the U-shaped profile, on the one hand, and the small radial clearance from the central recess of the supporting plate 10 exhibited by the radially, outwardly-lying lateral side of the U-shaped profile, on the other hand, a uniform rolling process for the membrane results when vibrations are introduced which have to be absorbed depending on operational conditions. As a result, longevity is decisively improved.

To prevent any destruction of the single-thrust bearing in cases of extreme inward and outward spring deflections, limit stops 13 are installed between the journal 2 and the supporting bearing 3. They can be provided inside or outside of the working chambers 4.

The working chambers 4 and the connecting port 5 are completely filled with a hydraulic fluid, for example with a mixture of glycol and water. The connecting port 5 has a duct-type design and is dimensioned so that a resonant movement of the contained bulk liquid results when vibrations of a particularly disturbing frequency are introduced. By this means, an excellent damping of such vibrations is effected.

On the other hand, when acoustically disturbing vibrations of a high frequency are introduced, only an axial back-and-forth movement of the outwardly protruding rim of the membrane 8 results inside the free space which is predetermined by the axial clearance to the supporting plates. Therefore, the vibrations cannot be transmitted from the shock absorber 1 to the supporting bearing 3.

In its bottom-side area, the supporting bearing 3 is provided with an angle ring 14 made of rubber elastic material which covers the upper end of a metallic spiral spring 15 in the radial direction and in the axial direction. The hardness of the rubber elastic material used to manufacture the angle ring 14 is selected so that droning vibrations cannot be transferred over the spiral spring and, in addition, so that a certain damping action results relative to such vibrations.

What is claimed is:

1. A single-thrust bearing for a shock absorber, comprising:
    a) a columnar journal projecting in the damping direction of the shock absorber;
    b) a supporting bearing;
    c) a flexible annular-shaped intermediary membrane sealing and surrounding said columnar journal and having a rim area projecting radially outward, said flexible annular-shaped intermediary membrane being secured in its rim area to said supporting bearing;
    d) two liquid-filled working chambers separated by said supporting bearing;
    e) a duct-type connecting port in said supporting bearing and located radially outside of said annular-shaped intermediary membrane to allow fluid communication between said two liquid-filled working chambers;
    f) flexible terminating walls sealing said two liquid-filled working chambers to the outside, and being secured and sealed on a first side to said columnar journal and on a second side to said supporting bearing; and
    g) hollow cones forming said flexible terminating walls and having hollow-cone tips secured to said columnar journal, pointing away from each other and braced against one another by means of said columnar journal;
    wherein said flexible annular-shaped intermediary membrane contacts said columnar journal in a way that allows relative displacement between contacting surfaces of said annular-shaped intermediary membrane and said columnar journal.

2. The single-thrust bearing according to claim 1, wherein said flexible annular-shaped intermediary membrane further comprises a bulge-like circumferential thickening in said inner circumference.

3. The single-thrust bearing according to claim 1, wherein said flexible annular-shaped intermediary membrane further comprises a U-shaped profile positioned between said rim area and said columnar journal and located radially inside said supporting bearing.

4. The single-thrust bearing according to claim 1, wherein said supporting bearing further comprises supporting plates extending at essentially right angles to the damping direction and axially embracing said flexible annular-shaped intermediary membrane in the vicinity of its rim.

5. A single-thrust bearing for a shock absorber, comprising:
    a) a columnar journal projecting in the damping direction of the shock absorber;
    b) a supporting bearing;
    c) a flexible annular-shaped intermediary membrane sealing and surrounding said columnar journal and having a rim area projecting radially outward, said flexible annular-shaped intermediary membrane being secured in its rim area to said supporting bearing;
    d) two liquid-filled working chambers separated by said supporting bearing;
    e) a duct-type connecting port in said supporting bearing and located radially outside of said annular-shaped intermediary membrane to allow fluid communication between said two liquid-filled working chambers;
    f) flexible terminating walls sealing said two liquid-filled working chambers to the outside, and being secured and sealed on a first side to said columnar journal and on a second side to said supporting bearing; and
    g) hollow cones forming said flexible terminating walls and having hollow-cone tips secured to said columnar journal, pointing away from each other and braced against one another by means of said columnar journal;
    wherein said flexible annular-shaped intermediary membrane further comprises an inner circumference which is flexibly expanded by said columnar journal; and
    wherein said flexible annular-shaped intermediary membrane contacts said columnar journal in a way that allows relative displacement between contacting surfaces of said annular-shaped intermediary membrane and said columnar journal.

6. The single-thrust bearing according to claim 5, wherein said flexible annular-shaped intermediary membrane further comprises a bulge-like circumferential thickening in said inner circumference.

* * * * *

UNITED STATES PATENT AND TRADEMARK OFFICE
CERTIFICATE OF CORRECTION

PATENT NO. : 5,474,284
DATED : December 12, 1995
INVENTOR(S) : Hamaekers A. et al.

It is certified that error appears in the above-indentified patent and that said Letters Patent is hereby corrected as shown below:

In column 3, line 7, change "tim" to --rim--; and in the Abstract in the first line, change "beating" to --bearing--.

Signed and Sealed this

Eighteenth Day of June, 1996

Attest:

BRUCE LEHMAN

Attesting Officer    Commissioner of Patents and Trademarks